United States Patent [19]

Kuntz et al.

[11] Patent Number: 4,991,682
[45] Date of Patent: Feb. 12, 1991

[54] ACCELERATION SENSOR

[75] Inventors: Walter Kuntz, Furtwangen; Manfred Sondergeld, St. Georgen/Schwarzwald, both of Fed. Rep. of Germany

[73] Assignee: Gebr. Schmidt Fabrik für Feinmechanik, Fed. Rep. of Germany

[21] Appl. No.: 298,611

[22] Filed: Jan. 18, 1989

[30] Foreign Application Priority Data

Jan. 20, 1988 [DE] Fed. Rep. of Germany ....... 3801512
Feb. 19, 1988 [DE] Fed. Rep. of Germany ....... 3805161

[51] Int. Cl.$^5$ .................. B60R 21/32; G01D 1/12
[52] U.S. Cl. .................................. 180/282; 280/735; 200/61.45 R; 242/107.4 R
[58] Field of Search .............. 280/735, 736, 740, 741; 73/492, 652, 517 R; 180/282; 200/61.45 R, 61.48, 61.49; 242/107.4 A, 107.4 R

[56] References Cited

U.S. PATENT DOCUMENTS

| 2,018,590 | 10/1935 | Adams | 200/615 |
|---|---|---|---|
| 2,190,866 | 2/1940 | Duby | 264/1 |
| 3,974,350 | 8/1976 | Breed | 200/61.53 |
| 4,204,703 | 5/1980 | Okada | 200/61.53 |
| 4,284,863 | 8/1981 | Breed | 280/735 |
| 4,381,829 | 5/1983 | Montaron | 280/735 |
| 4,410,875 | 10/1983 | Spies et al. | 280/735 |
| 4,666,182 | 5/1987 | Breed | 280/734 |
| 4,700,973 | 10/1987 | Gademann et al. | 280/735 |
| 4,734,265 | 3/1988 | Nilsson et al. | 280/735 |

FOREIGN PATENT DOCUMENTS 0251048 6/1987 European Pat. Off. .
2037704 7/1970 Fed. Rep. of Germany .

OTHER PUBLICATIONS

Magazin: IEEE Transactions on Electron Devices; vol. ED-26, No. 12, Dec. 1979, pp. 1911 to 1917, "A Batch--Fabricated Silicon Accelerometer" from Lynn Michelle Roylance and James B. Angell.

KfK report No. 3995 "Herstellen von Mikrostrukturen . . ." (Production of Microstructures), published by Kernforschungszentrum Karlsruhe (Karlsruhe Nuclear Research Center) Nov. 1985–Autor: E. W. Becker, W. Ehrfeld, P. Hagmann, A. Maner and D. Münchmeyer.

Primary Examiner—Richard A. Bertsch
Attorney, Agent, or Firm—Harness, Dickey & Pierce

[57] ABSTRACT

A sensor, preferably one of sub-miniature design, serves for measuring an acceleration (b). For this purpose, an electric signal representative of the acceleration (b) to be measured is generated by a sensor arrangement and evaluated as measured value. The sensor arrangement produces a predetermined logic signal when an acceleration threshold value is exceeded. In order to ensure high detection security and to obtain a computer-compatible signal, with the aid of an arrangement of small dimensions, one makes use of a plurality of sensors responding at different acceleration threshold values. The sensors are, preferably, designed as unilaterally fixed elastic tongues. The tongues are differently designed, with respect to their spring-and-mass properties, in order to provide different acceleration threshold values. They are arranged on a common substrate board and connected to a digital evaluation unit. A first bit pattern formed from the predetermined logic signals of the sensor is compared with second bit patterns. The second bit patterns are representative of physically possible or physically impossible conditions of the sensor arrangement. The logic signals are evaluated as a measured value only when the first bit pattern represents a physically possible condition.

21 Claims, 5 Drawing Sheets

| b/g | 27 | 28 | 29 | 30 | 31 |
|---|---|---|---|---|---|
| ø | 1 | 1 | 1 | 1 | 1 |
| 1 | ø | 1 | 1 | 1 | 1 |
| 2 | ø | ø | 1 | 1 | 1 |
| 3 | ø | ø | ø | 1 | 1 |
| 4 | ø | ø | ø | ø | 1 |
| 5 | ø | ø | ø | ø | ø |

| b/g | 27 | 28 | 29 | 30 | 31 | 51 |
|---|---|---|---|---|---|---|
| ø | ø | ø | ø | ø | ø | 1 |
| 1 | 1 | ø | ø | ø | ø | ø |
| 2 | 1 | 1 | ø | ø | ø | ø |
| 3 | 1 | 1 | 1 | ø | ø | ø |
| 4 | 1 | 1 | 1 | 1 | ø | ø |
| 5 | 1 | 1 | 1 | 1 | 1 | ø |

ACCELERATION SENSOR

The present invention relates to a method of measuring an acceleration, comprising the steps of generating an electric signal representative of the acceleration to be measured, by means of a sensor arrangement supplying a predetermined logic signal when an acceleration threshold value is exceeded, and evaluating the electric signal so obtained as measured value.

The invention further relates to an acceleration sensor, and more specifically, to a crash detecting apparatus for motor vehicles, comprising at least one spring-and-mass system which is exposed to the acceleration to be measured and Which actuates an electric contact when a predetermined acceleration threshold value is exceeded.

There have already been known in the art numerous methods of measuring an acceleration and numerous relevant acceleration sensors. The methods or sensors of the type which are of interest for the present purposes are intended only to detect conditions where a predetermined acceleration threshold value has been exceeded in order to derive therefrom specific reactions.

A typical application of such a method or sensor is the use in passenger safety systems in motor vehicles. These systems comprise, for example, an airbag, i.e. an air cushion which is blown up automatically When the motor vehicle hits against another object, or a belt pre-load device, i.e. a unit which tightens the safety belts applied by the passengers when the motor vehicles hits against another object.

Another typical application of such a method or sensor is their use for monitoring machines of all kinds, for the purpose of detecting any inadmissible self-resonance conditions.

It is of central importance in all these applications that erroneous triggering of the system be safely avoided because it is a characteristic of all these applications that emergency situations are involved which require exceptional measures in order to avoid damage or injuries. One deliberately accepts in these cases, under certain circumstances, minor damage or injuries or at least certain disagreeable side effects which means that any such measures should be triggered only in the presence of real emergency conditions. It is for this reason that numerous safety measures have been known, in particular in connection with passenger safety systems in motor vehicles, which consist, for example, in means which are capable of detecting not only the fact that a given acceleration threshold value has been exceeded, but also whether this condition, i.e. that the acceleration threshold value has been exceeded, continues to exist for a predetermined minimum period.

In applications of the type described above one uses today mainly methods and sensors of the analog type, which usually comprise a spring-and-mass system for measuring the force generated by the acceleration of the seismic mass. In order to detect the condition that a predetermined acceleration threshold value has been exceeded, one generates at first an analog electric signal representative of the force which likewise exhibits analog development characteristics, and supplies the analog electric signal so obtained to a comparator whose threshold value corresponds to the acceleration threshold value to be monitored.

One example of such applications are methods using piezo-resistive sensors, i.e. sensors comprising a pressure-sensitive resistor connected into a bridge circuit which is exposed to the action of the seismic mass. The bridge unbalance can then be used as analog electric signal and evaluated in the described manner.

On the other hand, however, there have also been known binary acceleration sensors where a seismic mass is deflected or released under the effect of the acceleration so that when a predetermined acceleration threshold value is exceeded a corresponding deflection of the seismic mass will be encountered and an electric signal will be generated by the mass in this predetermined deflected position. One example of such a sensor has been described by EP-OS 251 048.

The known acceleration sensors are assembled conventionally from discrete components, the measuring system as such, i.e. the spring-and-mass system, being frequently composed of a plurality of individual elements.

Consequently, the known methods, the sensors and the methods for producing the same are, generally, connected with the following disadvantages:

Firstly, analog measuring and evaluation methods are relatively difficult to carry out and to monitor, and are also sensitive to trouble and, finally, not compatible with modern data processing systems of the type used on board of motor vehicles. On the other hand, the known analog measuring methods and sensors are connected with the disadvantage that the detection of a predetermined acceleration threshold value may be rendered problematic due to drift phenomena, and the like, and it is above all very difficult to ensure the necessary safety from erroneous indications and, accordingly, erroneous triggering of the system. Finally, it is a drawback of known sensors that they require relatively high production input, due to the components used and. What is more, that they present relatively big dimensions so that the use of such sensors is rendered very difficult or even excluded in many applications.

Now, it is the object of the present invention to improve a measuring method, an acceleration sensor and a method for producing the same so that the disadvantages described above are avoided.

With respect to the measuring method described above, this object is achieved according to the invention by the fact that a plurality of sensors responding to different acceleration threshold values are used, that a first bit pattern formed from the predetermined logic signals of the sensors is compared with second bit patterns representative of physically possible or impossible conditions, and that the logic signals are evaluated as measured values only when the first bit pattern represents a physically possible condition.

With respect to the acceleration sensor described above, the object underlying the invention is achieved by the fact that the spring-and-mass system is designed as a unilaterally fixed elastic tongue and that a plurality of tongues with different spring-and-mass properties providing different acceleration threshold values are arranged on a common substrate board and connected to one digital evaluation unit.

Finally, the object underlying the present invention, with respect to the production method described above, is achieved by the fact that the tongues, the substrate board and a contact wall are produced by means of a lithographicgalvanotechnical imaging process (LIGA) or by the silicon technology.

The details of the LIGA process have been described, for example, by the KFK Report No. 3995 "Herstellung von Mikrostrukturen . . . (production of microstructures)" published by Kernforschungszentrum Karlsruhe (Karlsruhe Nuclear Research Center) in November 1985.

The object underlying the present invention is solved in this manner fully and perfectly.

The features described above for the measuring method guarantee that extreme safety from erroneous triggering is achieved because due to the plurality of sensors used it is possible to form bit patterns, i.e. groups of output signals of the sensors, which can be verified as to their plausibility, so that when a physically impossible quantity of output signals of the sensors occurs, the measured values will not be further processed and triggering of an airbag, for example, will be avoided.

The features described above for the acceleration sensor solve the object underlying the invention in the first line due to the fact that the plurality of tongues arranged on a common substrate board permits a plurality of parallel measurements to be carried out, which already provides a certain redundancy. In addition, however, a compact sensor is provided for carrying out the method described above, by the adjustment of different spring-and-mass properties.

Finally, the features described above with respect to the production method provide the advantage—which is essential for solving the object underlying the invention—that the LIGA process permits the production of a plurality of shapes from an almost unlimited choice of initial materials, such as metals, plastic materials, or the like. This provides the advantage that spring-and-mass systems of almost any desired shape can be accommodated at very limited space so that it is now possible to produce acceleration sensors whose spring-and-mass systems are free from self-resonance in the operating range of the sensor, but which still respond quickly and can be produced in tiny dimensions. Accordingly, the acceleration sensors produced in this manner can be integrated even under extremely difficult local conditions, and may even be combined directly with electronic components, to form units of overall dimensions smaller than could ever be achieved before.

According to a preferred improvement of the measuring method according to the invention, a physically impossible bit pattern is recognized when the predetermined signal is generated by a first sensor responding at a first acceleration threshold value, but is not likewise generated by a second sensor responding at a second, lower acceleration threshold value.

This variant of the method makes use of the fact that when acceleration sensors With graduated response thresholds are used it is a matter of course that when a first acceleration sensor having the higher response threshold responds, all other sensors having lower response thresholds must have responded, too. In order to increase the reliability of the method according to the invention it is, therefore, possible to provide a plurality of tongues, which may be finely graduated With respect to their associated acceleration threshold values, especially in the acceleration range of interest for the present purposes, and to provide that the system served by the sensor will be triggered only when several neighboring tongues have responded.

Although this variant introduces into the method a certain tolerance, it increases the safety from erroneous triggering quite considerably.

According to another improvement of the measuring method according to the invention, the first sensor is connected to a passenger safety system of a motor vehicle, and an airbag or a belt pre-load device, or the like, will be triggered, when an acceleration threshold value has been exceeded, only if a second sensor having a lower acceleration threshold value has responded, too.

These features provide the advantages which have been described before and which make the measuring method according to the invention suitable for use in connection with passenger safety systems in motor vehicles.

According to one variant of the acceleration sensor according to the invention, the tongues are fixed in a position vertical to the direction of the acceleration to be measured, and have different lengths, measured from their fixing point. Alternatively, or in addition to this feature, the thickness of the tongues may also be different, in the direction of acceleration.

This feature provides the advantage that the acceleration threshold values can be predetermined very easily by appropriate adjustment of the length and/or thickness of the tongues, because the unilaterally fixed tongues otherwise exhibit identical spring-and-mass behavior. Consequently, it is possible in this manner to adjust graduated acceleration threshold values in a simple manner by corresponding graduation of the lengths and/or thicknesses of the tongues. Graduating the thicknesses by the factors $1/\sqrt{2}/\sqrt{3}/2/\sqrt{5}$ leads, for example, to a graduation of the acceleration threshold values of 1/2/3/4/5.

According to a particularly preferred variant of this embodiment of the invention, the tongues are fixed in aligned positions and come to rest against a common contact wall in their active position where they close an electric contact.

This feature provides the advantage that a particularly compact structure and simple production of the sensor is rendered possible because all tongues are arranged beside each other, and only one common contact wall is required for all tongues. The contact Wall may, for example, be made entirely from an electrically conductive material so that only one common return line is required for detecting the open or closed condition of the electric contacts.

According to another preferred embodiment of the acceleration sensor according to the invention, the tongues are designed as two-way contacts and are connected in series into a first circuit in their rest position, and in parallel into a second circuit in their active position.

This feature provides the advantage that the series connection of the first circuit can be easily monitored in the rest position by means of a no-signal current monitoring system, so that one can determine easily if all tongues have returned to their rest position after they had been triggered. In the triggered condition, in contrast, the tongues are supplied with voltage in parallel so that it is possible to determine selectively which of the tongues have responded, and which have not.

According to another preferred embodiment of the method according to the invention, the free ends of the tongues project freely in the rest position, Without making any contact, while under the effect of an acceleration they move in diametrically opposite directions towards the contact walls arranged on both sides of the tongues.

This feature provides the advantage that a bidirectional acceleration sensor can be implemented, which enables acceleration threshold values to be detected in diametrically opposite directions.

In addition, it is of advantage for the embodiments of the sensor according to the invention described above if each of the tongues is provided with a separate electric connection, while the contact wall is equipped with a common connection for all tongues.

This feature provides the advantage that the circuitry input can be minimized.

According to another preferred embodiment of the invention, the tongues are seated tightly in grooves provided in the contact wall, in their rest position or in their active position.

This feature provides the advantage that the tongues can be cushioned pneumatically as, being guided tightly in the grooves, they have to displace a certain air volume during their response movement. By suitable selection of the geometry, in particular of the displaced air volume and the throttling effect of the tight arrangement of the tongues in the grooves it is, therefore, possible to adjust dampened characteristics of the acceleration sensor almost at desire. The air-gap dampening described above may be of advantage, above all, when the tongues, the substrate board and the stop wall are designed as a single unit of extremely small dimensions, as will be described further below in connection With one embodiment of the tongues, because in this case the common production process will enable the components to be produced with the required precision and also in dimensions at which notable air-gap dampening effects are achieved and at which these effects can be utilized for adjusting desired characteristics.

According to one further preferred feature, the tongues are made from a material of high internal friction, preferably of a plastic material.

This feature provides the advantage that self-resonances of the acceleration sensor are largely attenuated so that any erroneous triggering by resonance step-ups can be excluded.

A particularly advantageous effect is achieved in this case when the tongues consist of a metallized plastic material.

This feature provides the advantage that in spite of the use of an electrically non-conductive material it is possible to produce contact arrangements with any desired contact surfaces, conductor paths, or the like.

According to another preferred embodiment of the acceleration sensor according to the invention, the evaluation unit comprises a bit-pattern storage and a digital comparator.

These features provide the advantage Which has already been described before, namely that additional safety from erroneous triggering is achieved by comparing physically possible and physically impossible bit patterns.

Another preferred embodiment of the invention provides that the evaluation unit comprises a recoder.

This feature provides the advantage that the code resulting from the different graduation of the acceleration threshold values is translated into a usual code, for example a BCD code or any other code suited for being processed on usual data processing systems.

Finally, another embodiment of an acceleration sensor according to the invention is preferred where the tongues have a thickness of only a few $\mu m$, preferably 0.5 to 10 $\mu m$, and a length equal to 200 to 1000 times, preferably 500 times, their thickness.

This feature provides the advantage that acceleration sensors of a smallness that has been unknown heretofore can be provided which permit almost unlimited variations as regards their place of installation and which in addition permit the use of smallest seismic masses, which means that they can operate without the known disturbing effects encountered in large acceleration sensors, in particular self-resonances in the operating range of such acceleration sensors. For, if acceleration sensors are produced in the micro-range, the resonance frequencies of the tongues will be far above the frequency range in which the accelerations to be measured occur.

This selection of dimensions, which is rendered possible by the LIGA method or the silicon technology used according to the invention, provides the advantage that due to the extreme thinness of the tongues one can do without any additional seismic masses, Whereby the rapidity of action of the sensor is increased and the tendency to self-resonances is reduced.

Other advantages of the invention will appear from the specification and the attached drawing.

It is understood that the features that have been described before and will be explained hereafter may be used not only in the described combinations, bug also in any other combination, or individually, without leaving the scope and intent of the present invention.

Certain embodiments of the invention will now be described in more detail with reference to the drawing in which.

Figures 1, 1A:
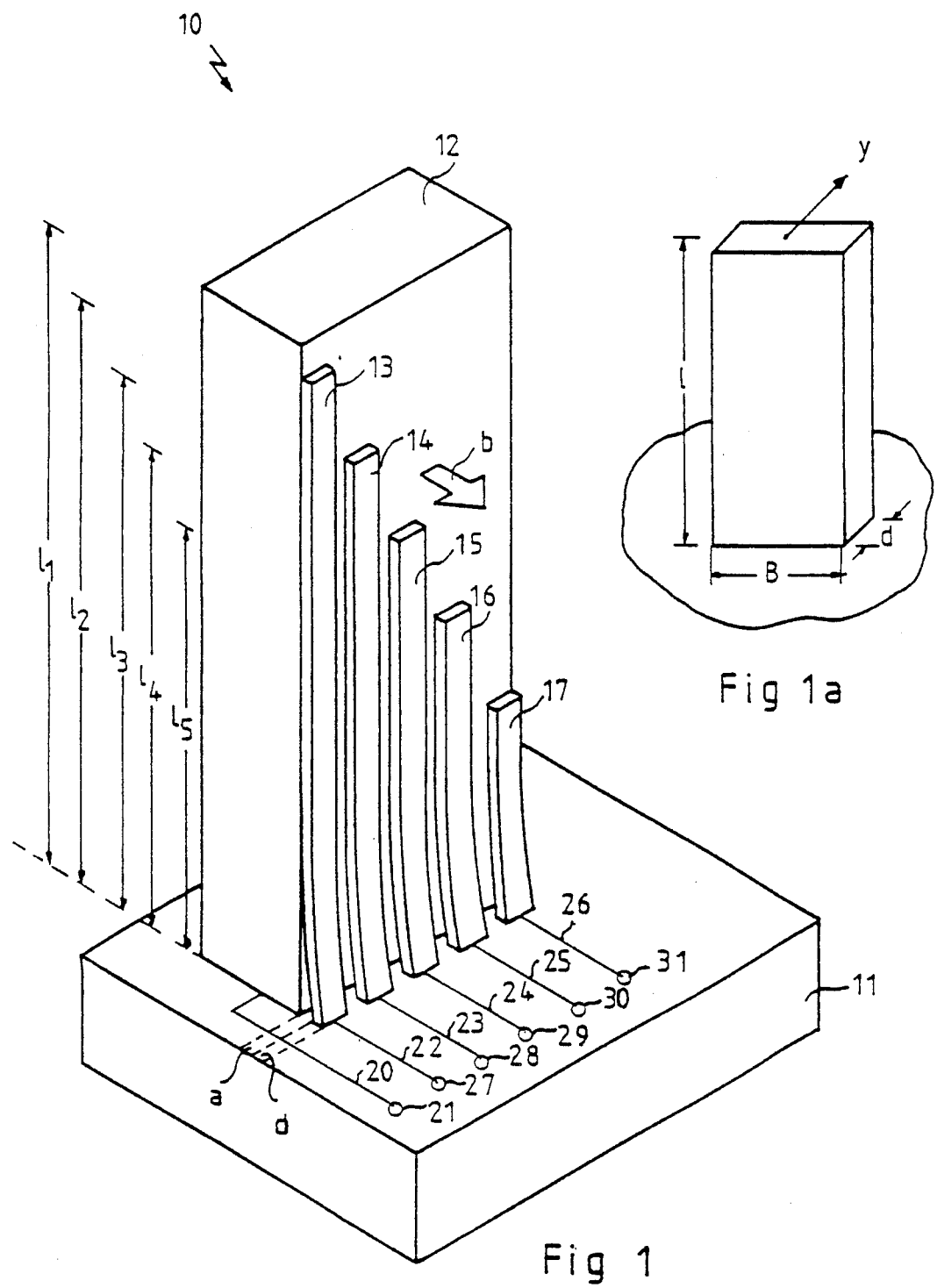
FIG. 1 shows a perspective view of one embodiment of an acceleration sensor according to the invention, with tongues of different lengths.
FIG. 1a shows a representation of a unilaterally fixed bending rod.

Regarding now FIG. 1, an acceleration sensor is indicated generally by reference numeral 10. A common substrate board 11 carries a contact wall 12 projecting at a right angle therefrom and a plurality of tongues 13, 14, 15, 16 and 17 fixed unilaterally in the substrate board 11 and projecting upwardly therefrom in a direction substantially parallel to the contact wall 12. The tongues 13 to 17 are fixed in the substrate board 11 in such a manner that their free ends rest resiliently against the contact wall 12.

Figure 2:
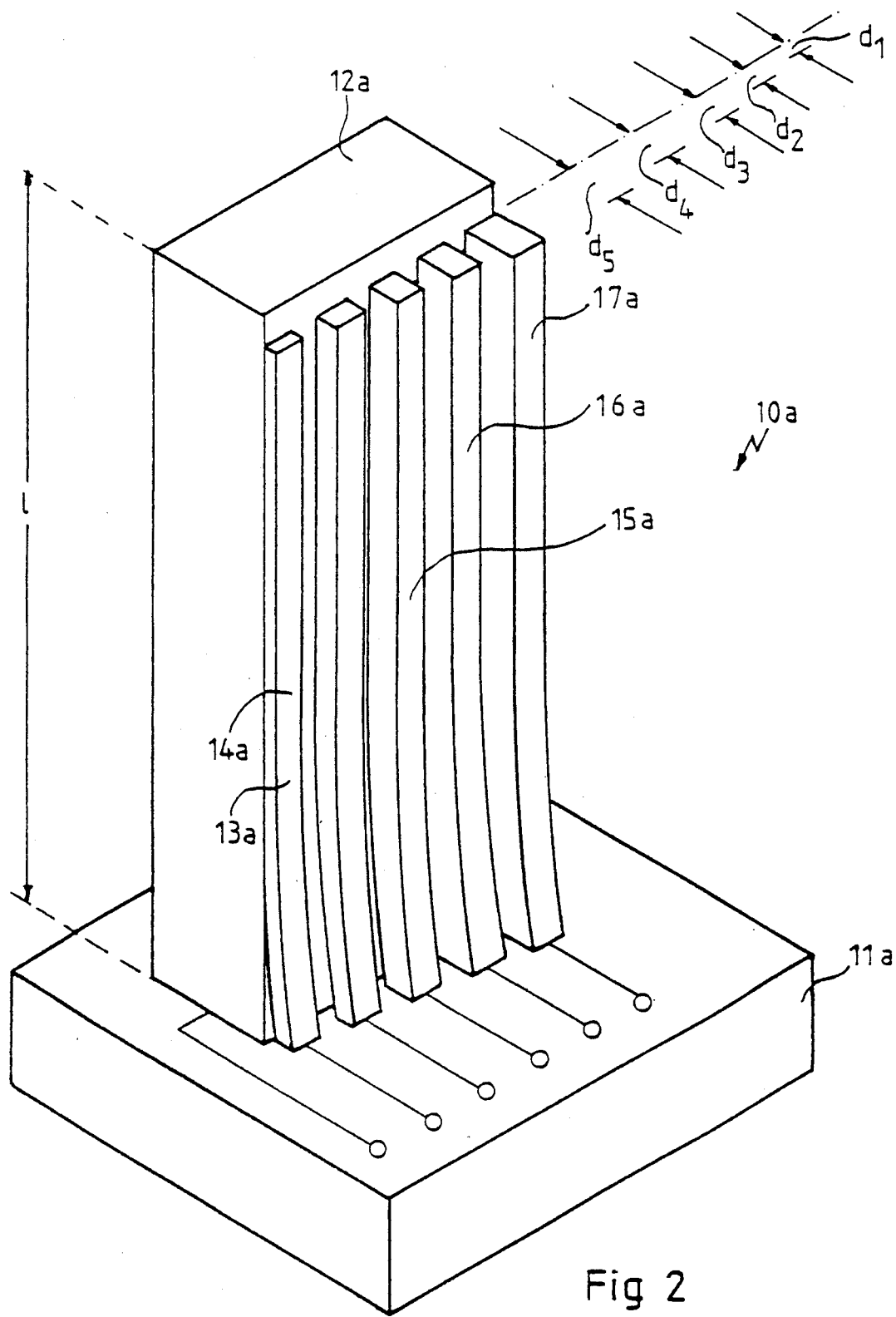
FIG. 2 shows a variant of FIG. 2, with tongues of different thicknesses.

As will be seen clearly in FIG. 1, and also in FIG. 2, the tongues 13 to 17 have different lengths $l_1$ to $l_5$, measured from their fixing point in the substrate 11, but an identical thickness d. The widths of the tongues 13 to 17 are also identical.

The contact wall 12, which may be produced, for example, from a metallic conductive material, is connected to a first contact point 21 via a common connection line 20. The tongues 13 to 17 are connected to further connection lines 22 to 26 leading to other contact points 27 to 31.

Figure 3:
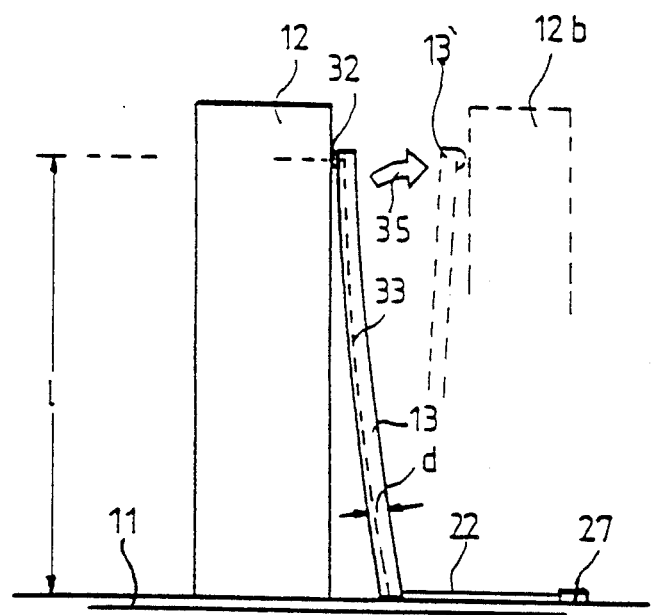
FIG. 3 shows a side view of the sensor according to FIG. 1.

In FIG. 3 it can be seen that the tongues 13 to 17 may be provided for this purpose, for example on their free ends, with a contact button 32 which is connected to the connection lines 22 to 26 via a line 33 arranged in or on the tongues 13 to 17.

The connection lines 22, 22 to 26, as well as the line 33 may be implemented in the form of a metallic deposit on the plastic or ceramic material from which the tongues 13 to 17 and/or the substrate board 11 have been produced.

Preferably, the tongues 13 to 17 consist of a material having high internal friction, in particular a plastic material, in order to reduce the tendency to develop self-resonances.

It has been mentioned before that the tongues 13 to 17 are fixed unilaterally in the substrate board 11, for example at a distance a from the contact Wall 12. Their free ends rest against the contact wall 12, as viewed in FIG. 1. Now, when an acceleration b acts perpendicularly upon the contact wall 12, as indicated by the arrow in FIG. 1, the tongues 13 to 17 are displaced from their contact position when the amount of acceleration b, combined With the mass and the spring rates of the tongues 13 to 15, is sufficient to overcome the force by which the tongues 13 to 17 are urged elastically against the contact wall 12. If this is the case, then the electric contact between the first contact point 21 and one or more of the other contact points 27 to 31 will be interrupted.

By giving the tongues 13 to 17 predetermined graduated lengths, it is possible, for example, to implement an arrangement where the first tongue 13 will be lifted off its contact position at an acceleration of 1g, the second tongue 14 will be lifted off at an acceleration of 2g, the third tongue 15 will be lifted off at an acceleration of 3g, etc.

FIG. 1a shows a diagrammatic perspective view of a bending bar which is fixed unilaterally at its bottom and which is deflected in the direction indicated by arrow y under the action of a force acting perpendicularly to the direction in which the bar is fixed. As is generally known, the deflection y is defined by the formula $$Y = b \frac{3\rho l^4}{2Ed^2}$$

wherein b is the active acceleration, $\rho$ is the density of the material of the bending bar, E is the modulus of elasticity, l is the length and d is the thickness of the bending bar. If such a unilaterally fixed bending bar is to be displaced a predetermined contact travel of y=s, then the length l of the contact tongues is defined by the following formula:

$$l_i = \frac{1}{b_i^{\frac{1}{4}}} \cdot \frac{2E^{\frac{1}{4}}}{3\rho} (sd^2)^{\frac{1}{4}}$$

wherein the thickness d is constant and i is the graduation of the length, which then leads to acceleration threshold values $a_i$ for the $i^{th}$ contact tongue.

It follows from the above considerations that different acceleration threshold values can be adjusted also by varying the thickness of the contact tongues, in Which case the following formula applies:

$$d^{\frac{1}{1}} = a_i^{\frac{1}{2}} \left( \frac{3\rho}{2E} \right)^{\frac{1}{2}} \frac{l^2}{s^{\frac{1}{2}}}$$

wherein the length l has been assumed to be constant and different acceleration threshold values $a_i$ are obtained for graduated thicknesses $d_i$ of the tongues.

FIG. 2 illustrates in this connection a practical example of an acceleration sensor 10a where the tongues 13a to 17a exhibit all the same length 11, as described before, but different thicknesses $d_1$, $d_2$, $d_3$, $d_4$ and $d_5$.

If the thicknesses of the tongues 13a to 17a are graduated, for example, by the factors $1, \sqrt{2}/\sqrt{3}/2/\sqrt{5}$, then one obtains acceleration threshold values with the graduation 1/2/3/4/5, related to the acceleration threshold value of the tongue having the smallest thickness.

However, it is understood that the tongues 13 to 17, or 13a to 17a, may also be designed in such a manner that they vary with respect to both their length and their thickness, if this should prove to be convenient under the circumstances of a given case.

Figure 4:
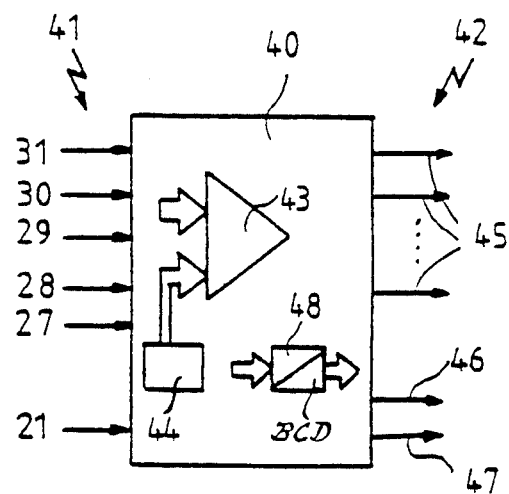
FIG. 4 shows an extremely diagrammatic representation of an electronic evaluation unit used according to the invention.

FIG. 4 shows an example of an electronic evaluation unit 40 with inputs 41 and outputs 42. The inputs 41 are connected to the contact points 21 and 27 to 31. The evaluation unit 40 includes a digital comparator 42 which compares the bit pattern present at the inputs 41 with other bit patterns stored in a bit-pattern storage 44, as will be described in more detail further below. A recoder 48 serves for translating the input code represented by the inputs 41 into an output code of the usual kind, for example a BCD code, which may be tapped at signal outputs 45 and supplied to further evaluation and triggering units.

Reference numeral 46 designates a warning output 46, while reference numeral 47 designates a trouble output, the warning output 46 supplying a signal when a defect has been encountered, but the defect is not yet critical, while the trouble indication 47 indicates the presence of a system error.

For differentiating between the situations Which lead to the emission of a warning signal or a trouble signal, different criteria are imaginable and possible.

Hereafter, the terms "physically possible" and "physically impossible" will be used to describe situations where the measuring arrangement generates a measured value representative of acceleration conditions which are either physically possible or physically impossible. In the first-mentioned case, the tongues 13, 14 and 15 may, for example, have responded, while the tongues 16 and 17 have not. In this case, the recorded acceleration must lie between the threshold values of the tongues 15 and 16. As the tongue having the length $l_3$ has responded, the tongues 13 and 14 must necessarily have responded, too, as they have the greater lengths $l_1$ and $l_2$, i.e. the lower spring rates. If, however, the measuring arrangement indicates an acceleration value at which the tongue 15 responds, while the tongues 13 and 14 do not, then an impossible acceleration condition must be involved, because there cannot possibility exist an acceleration value which would cause only the tongue 15 to deflect, but leave the tongues 13 and 14 unaffected, although they have the lower spring rates.

In order to differentiate between such cases, it is for example possible, in cases Where the measuring arrangement is to detect accelerations of a given acceleration range, to use a fine graduation for the tongues responding in this range. Even if one of the tongues should then fail in this range, the next lower or higher tongue would still respond, and by adjusting a corresponding measuring tolerance covering the range of response of two tongues it would even be possible to release the triggering action when a tongue associated with a higher acceleration threshold value has responded, while the next lower tongue has not. In addition, it is possible, by adjusting the bit pattern in a convenient manner, to observe how the recorded acceleration values have developed over time. If bit patterns recorded at short time intervals show that the recorded acceleration increases monotonously, discrete failures of tongues can be detected according to predetermined plausibility criteria, for example when the tongues 13, 14, 16 and 17 respond successively, because it will be very probable in this case that the tongue 15 has become defective. In any such case, the warning output 46 may be actuated. If, however, the tongues 13, 14 and 17 are triggered successively, without the tongues 15 and 16 having responded, then it would seem more probable that the tongue 17 has become defective, rather than the two tongues 15 and 16, and in this case the trouble indication should be actuated and the triggering device, if any, associated with the tongue 17 should not be permitted to respond.

Figure 5:
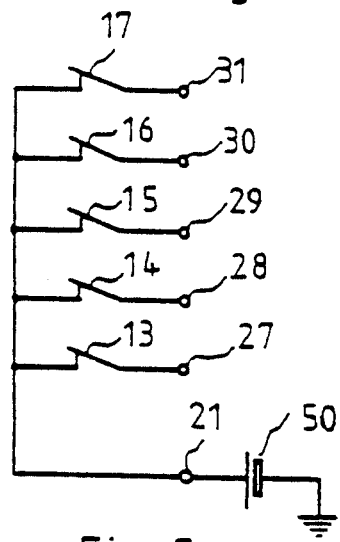
FIG. 5 shows an equivalent electric circuit diagram of the acceleration sensor represented in FIGS. 1 to 3.

The equivalent electric circuit diagram shown in FIG. 5 illustrates the variant of the acceleration sensor 10 shown in FIG. 1. It appears that the tongues 13 to 17 have the function of normally-closed contacts Which means that they are closed in their rest position. If, therefore, a positive voltage is supplied from the voltage source 50 via the first contact point 21, this positive voltage will be supplied similarly to the other contact points 27 to 31 if all tongues 13 to 17 are in contact with the contact wall 12. As the acceleration increases, the voltage will disappear initially at the first contact point 27, and then also at the following contact points 28 and 29, etc., depending on how the acceleration continues to rise.

The broken lines in the right half of fig. indicate a variant of the acceleration sensor 10 according to FIG. 1 where a second contact Wall 12b is arranged at a distance from the first contact wall 12. If an acceleration b acting upon the acceleration sensor is sufficient to lift off, for example, the first tongue 13, this first tongue 13 is deflected sufficiently far, in the case of this variant, to bring it into contact with the other, opposite contact Wall 12, as illustrated by arrow 35 in FIG. 3. Under circuitry aspects this means that noW normally open contacts are formed by the tongues 13 to 17 because an electric contact is made only when the predetermined acceleration threshold value is exceeded.

Figure 6:
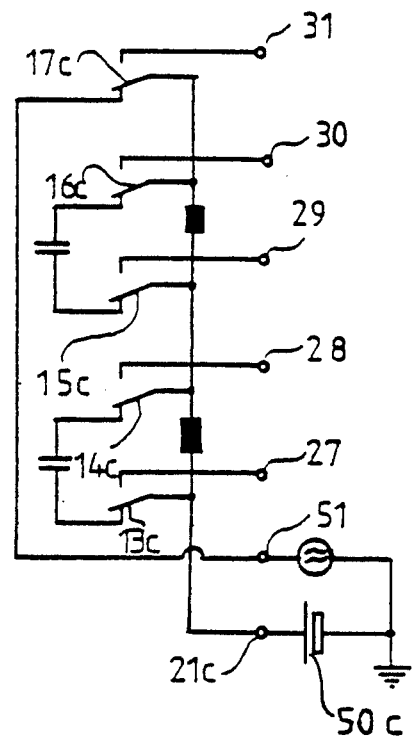
FIG. 6 shows an equivalent electric circuit diagram of the other embodiment of an acceleration sensor according to the invention, indicated in FIG. 3.

If both contact walls 12 and 12b are provided, and both of them are equipped with corresponding contacts, then the electric circuits indicated in FIG. 6 can be realized. In this figure, the tongues of the illustrated embodiments are designated by reference numerals 13c to 17c. It appears from FIG. 6 that the tongues 13c to 17c are again supplied with voltage in a first circuit which is supplied with direct current from the voltage source 15c, so that now a positive voltage is encountered at the contact points 27 to 31 when the acceleration has exceeded the respective threshold values.

On the other hand, the normally-closed contacts are connected in series in a second circuit so that it is possible, with the aid of a no-signal current monitoring system, to detect if all tongues 13c to 17c rest against the contact wall 12 in their rest positions.

In order to decouple the two circuits, it is possible, for example, to operate the one circuit with d.c. signals and the other circuit with rf signals, and to decouple the two circuits by capacitors or reactance coils, as indicated in FIG. 6.

Figures 7, 8, 9:
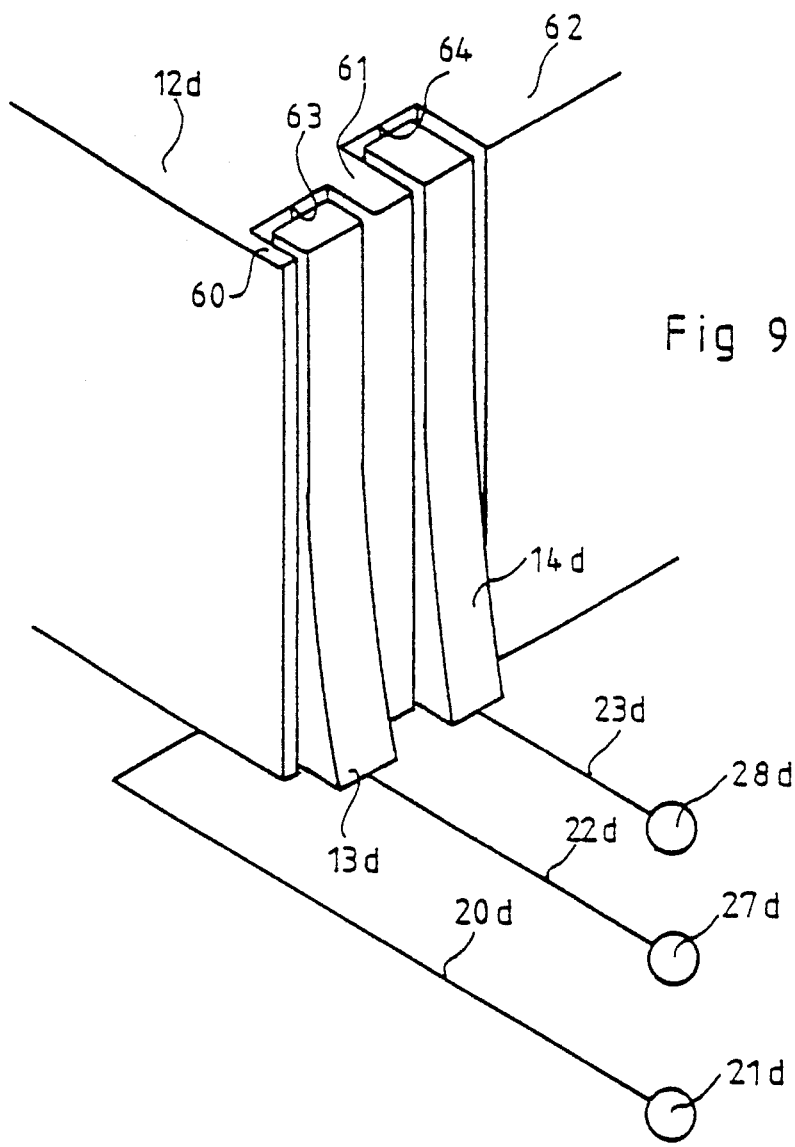
FIG. 7 shows a truth table explaining the equivalent circuit diagram shown in FIG. 5.
FIG. 8 shows a truth table explaining the equivalent circuit diagram illustrated in FIG. 6.
FIG. 9 shows a detail, in enlarged scale, of a representation similar to that of FIG. 2, but for another embodiment of an acceleration sensor according to the invention.

The truth tables represented in FIGS. 7 and 8 illustrate once more in tabular form the condition described above.

Regarding initially FIG. 7, the left column contains the acceleration in g, while the five right columns contain the logic signals supplied at the contact points 27 to 31, respectively.

If the acceleration applied is equal to 0g, then all tongues 13 to 17, or 13a to 17a, rest against the contact wall 12 or 12a in the embodiment illustrated in FIGS. 1 and 3, so that a positive logic signals "1" is supplied at all contact points 27 to 31.

As the acceleration rises, the tongues 13 to 17 will open successively, and when an acceleration of, for example, 2g has been reached, the tongues 13 to 15 will have been lifted off, while the tongues 16 and 17 will still be in contact with the wall. Consequently, a logic zero signal will be supplied at the contact points 27 to 29, while the contact points 30 and 31 will still supply a positive logic signal.

Now, the bit patterns corresponding to different lines of the truth table of FIG. 7 may be examined as to their plausibility by the digital comparator 43. If, for example, a bit pattern of 00010 or 11011 were encountered at the inputs 41 of the evaluation unit 40, both patterns would have to be regarded to represent physically impossible conditions of the acceleration sensor 10. For, both cases indicate that a tongue having a higher spring rate, i.e. a higher acceleration threshold value, has been lifted off while a tongue having a lower spring rate, i.e. a lower acceleration threshold value, is still in contact With the wall although it should long have been lifted off. This suggests the presence of a system error in both cases, and consequently either the warning output 46 or the trouble output 47 should supply a corresponding signal in the manner described before.

The truth table of FIG. 8, which relates to the equivalent circuit diagram shown in FIG. 6, corresponds in full to the truth table of FIG. 7, except that all logic signals are inverted because the embodiment illustrated in FIG. 6 uses normally-open instead of normally-closed contacts. Further, an additional column 51 is provided which indicates that it is only in the rest position (b=0g) that all tongues 13c to 17c are in contact with the wall.

FIG. 9 shows a variant of the acceleration sensor 10 according to FIG. 1 where the tongues 13, 14, etc., are not in contact with a level surface of the contact wall 12; rather, a contact wall 12b is provided with projections 60, 61, 62, etc., forming between them grooves 63, 64. Tongues 13d, 14d engage these grooves 63, 64 and rest against the contact wall 12d, the tongues 13b, 14b being tightly guided in the grooves 63, 64. One obtains in this manner an air-gap dampening system because the air volume enclosed by the tongues 13d, 14d in the grooves 63, 64 can enter and escape only through the throttles formed by the tight engagement of the tongues 13d, 14d in the grooves 63, 64.

The embodiments of the sensors 10 described above in connection with FIGS. 1, 2, 3 or 9 are produced, preferably, by means of a lithographic-galvanotechnical imaging process of the type known under the name "LIGA". The LIGA process makes it possible, by means of deep x-ray lithography, to produce microscopically small dimensions in the micrometer range, with tolerances of 0.1 μm, while the materials can be selected within very broad limits. It is, for example, possible in this manner to process plastic materials or metals, or metallized plastic materials. In particular, the LIGA process permits the production of tongues 13 to 17 with a length-to-thickness (l:d) ratio of approximately 500:1, with the thickness d being equal to approx. 2 μm. Due to this geometry and these dimensions no additional seismic masses are required, and extremely small dimensions are achieved which enable the mechanical sensor elements to be combined with microelectronic components having similar dimensions.

As an alternative to the LIGA process, the described structures can be produced also by the silicon technology, where the desired three-dimensional structures are produced in the known manner from a silicon substrate, by etching processes.

The structure illustrated in FIG. 9 has also been produced with the aid of the LIGA process or by the silicon technology. The microstructures that can be produced with the aid of the before-mentioned processes have proved to be of particular advantage for designs provided with an air-gap dampening system because particularly effective dampening can be achieved with dimensions in the gm range, due to the very low seismic masses.

FIGS. 10 to 14 finally illustrate certain examples of bidirectional acceleration sensors. Here again, identical elements have been designated by the same reference numerals, supplemented only by a lower-case letter.

Figure 10:
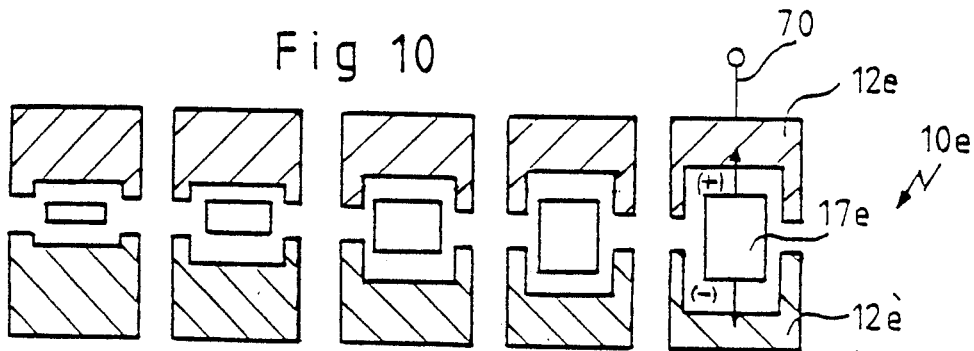
FIG. 10 shows a diagrammatic top view of another embodiment of an acceleration sensor according to the invention, with bidirectional measuring behavior.
Figure 11:
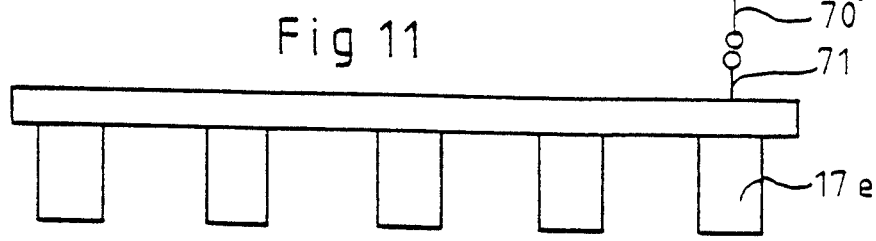
FIG. 11 shows a side view of the tongue arrangement shown in FIG. 9.

In the case cf the variant illustrated in FIGS. 10 and 11, a common body is provided for the tongues. The thickest of the tongues is designated by reference numeral 17e. The continuous tongue body is arranged at the axis of symmetry between two contact walls 12e and 12e' provided in mirror-symmetrical arrangement. The marks (+) and (−) at the tongue 17e indicate that this tongue 17e can move in diametrically opposite directions toward the contact walls 12e and 12e', depending on the direction in which an acceleration acts upon the tongue 17e.

The contact walls 12e and 12e' for the individual tongues are separated from each other and connected each to a separate connection 70 or 70'. In contrast, the common body of the tongues 17e is provided with a single common connection 71.

According to one practical embodiment of this variant, this can be achieved by making all structural elements from a ceramic or a plastic material and providing a metallization on the surfaces facing each other. Alternatively, however, the common body of the tongues 17e may also be made from metal, for example.

The embodiment illustrated in FIGS. 12 and 13 comprises again an air-gap dampening arrangement for the tongues 17f, as described before in connection with the embodiment illustrated by FIGS. 9 to 11.

Figure 12:
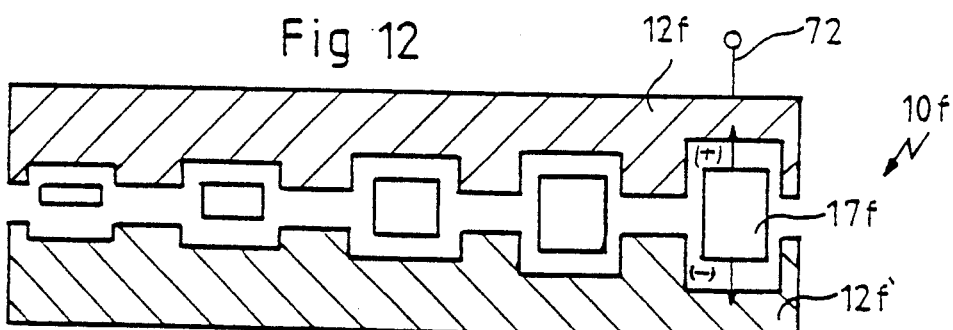
FIGS. 12 and 13 show a variant of the bidirectional acceleration sensor illustrated in FIGS. 10 and 11.
Figure 13:
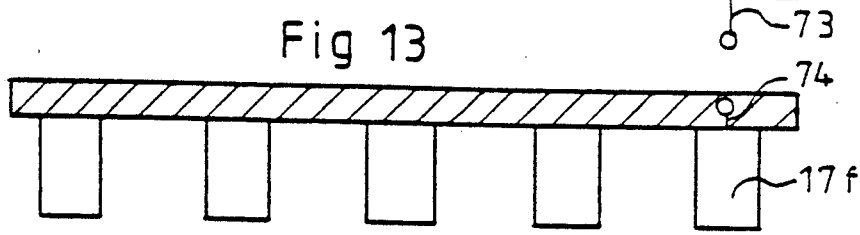

The variant of the bidirectional acceleration sensor 10f of FIGS. 12 and 13 differs from that of figs. 10 and 11 insofar as the contact walls 12f and 12f' are now formed as one piece, while the tongues 17f are designed as separate elements which are electrically insulated from each other. Accordingly, the contact walls 12f and 12f' may be provided with common connections 72 or 73, while separate connections 74 must be assigned to each of the tongues 17f.

If one compares the lines necessary for the embodiments according to FIGS. 10/11 on the one hand and 12/13 on the other hand, it will be found that the circuitry input is lower for the embodiment of FIGS. 12/13, which corresponds to the embodiments of FIGS. 1/3 and 8, from the electric point of view.

Figure 14:
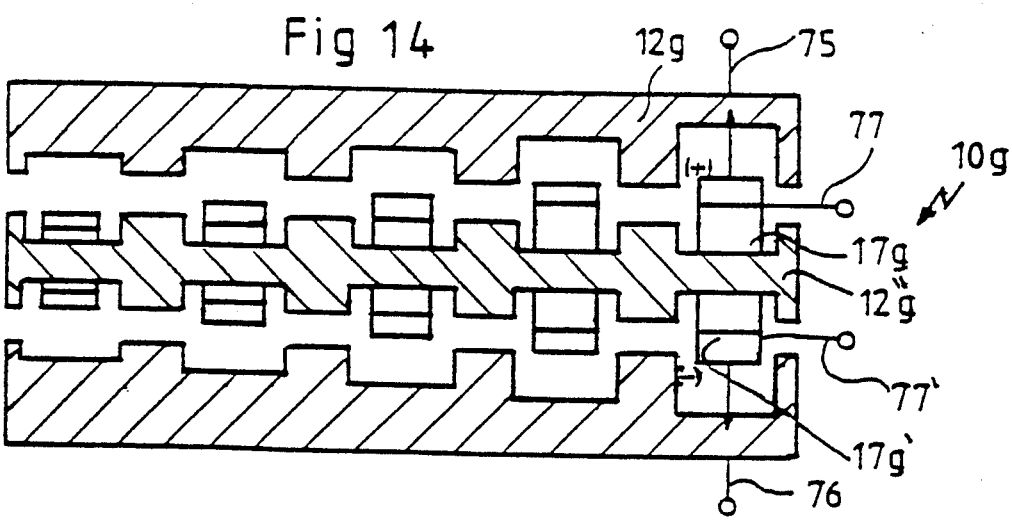
FIG. 14 show another variant of the bidirectional acceleration sensors illustrated in FIGS. 10 to 13.

FIG. 14 finally shows another variant where a bidirectional acceleration sensor is equipped with three contact walls 12g, 12g' and 12g''. As in the case of the embodiment indicated by broken lines in FIG. 3, the tongues 17g or 17g' are designed as two-way contacts which in their rest position rest against a common contact wall 12g'', while when deflected they come into contact with either the upper contact wall 12g or the lower contact wall 12g'in FIG. 14, depending on whether the acceleration acts in the (+) or in the (−) direction.

It is understood that instead of giving the tongues of the embodiments according to FIGS. 9 to 14 different thicknesses, they may also be given different lengths or different thicknesses and lengths.

We claim:

1. An apparatus for measuring acceleration, comprising:

a plurality of acceleration sensors, being jointly subjected to an acceleration to be measured, said sensors being designed to switch and generate at an output thereof a logical signal when a predetermined individual acceleration threshold value is exceeded, with individual threshold values of said acceleration sensors being different one from the other;

sampling means for sampling a bit-pattern consisting of said logical signals at said outputs when an acceleration is exerted on said sensors;

memory means having stored therein a plurality of bit patterns corresponding to physically possible or impossible switching conditions of said plurality of sensors;

comparing and determining means for comparing said sampled bit-pattern with said stored bit-patterns and for determining whether said sampled bit-pattern corresponds to a physically possible or a physically impossible switching condition of said plurality of sensors;

measuring means connected to said output of a predetermined one of said acceleration sensors for measuring whether said individual acceleration threshold value of said one predetermined acceleration sensor is exceeded;

suppressing means connected to said comparing and determining means and to said measuring means for deactivating said measuring means when said sampled bit-pattern corresponds to a physically impossible switching condition of said plurality of sensors.

2. The apparatus of claim 1, wherein a physically impossible bit pattern is determined when a logical signal is generated by a first acceleration sensor designed to switch at a first acceleration threshold value, but is not likewise generated by a second acceleration sensor designed to switch at a second acceleration threshold value being lower than said first acceleration threshold value.

3. A crash detecting apparatus for motor vehicles, comprising:

a plurality of acceleration sensors being mounted on said motor vehicle, said sensors being designed to switch and generate at an output thereof a logical signal when an acceleration acting upon said motor vehicle exceeds a predetermined individual acceleration threshold value, With individual threshold values of said acceleration sensors being different one from the other;

sampling means for sampling a bit-pattern consisting of said logical signals at said outputs when an acceleration is exerted on said sensors;

memory means having stored therein a plurality of bit-patterns corresponding to physically possible or impossible switching conditions of said plurality of sensors;

comparing and determining means for comparing said sampled bit-pattern with said stored bit patterns and for determining whether said sampled bit-pattern corresponds to a physically possible or a physically impossible switching condition of said plurality of sensors;

measuring means for activating passenger safety means and being connected to said output of a predetermined one of said acceleration sensors for measuring whether said individual acceleration threshold value of said one predetermined acceleration sensor is exceeded;

suppressing means connected to said comparing and determining means and to said measuring means for deactivating said measuring means when said sampled bit pattern corresponds to a physically impossible switching condition of said plurality of sensors.

4. The apparatus of claim 3, wherein a physically impossible bit-pattern is determined when a logical signal is generated by a first acceleration sensor designed to switch at a first acceleration threshold value, but is not likewise generated by a second acceleration sensor designed to switch at a second acceleration threshold value being lower than said first acceleration threshold value.

5. The apparatus of claim 3, wherein said passenger safety means is an airbag.

6. The apparatus of claim 3, wherein said passenger safety means is a safety belt tightening device.

7. An acceleration sensor comprising:
a base member;
a plurality of bending rods being jointly subjected to an acceleration and being rigidly connected at one end to said base member, said bending rods being designed individually With respect to their elasticity and their mass such that they are deflected differently when an acceleration is exerted on said plurality of rods;

first electric contact elements arranged on free ends of said rods;

second electric contact elements connected to said base member and being arranged relative to said first electric contact elements such that electric circuits between individual first electric contact elements and neighboured second electric contact elements are switched at different predetermined acceleration threshold values.

8. The acceleration sensor of claim 7, wherein said rods are arranged in a position perpendicular to a direction of said acceleration to be measured, said rods having different lengths.

9. The acceleration sensor of claim 8, wherein said rods are arranged in aligned relationship, a wall being arranged in parallel to said aligned rods and bearing said second contact elements, said wall being arranged at a distance from said rods such that individual rods come to rest upon said wall when a predetermined acceleration value is exceeded.

10. The acceleration sensor of claim 9, wherein each of said rods is provided with a separate first electric contact element, while said wall is equipped with a common second electric contact element for all rods.

11. The acceleration sensor of claim 9, wherein said rods are seated tightly in grooves provided in said wall.

12. The acceleration sensor of claim 9, wherein said rods are made from a material of high internal friction.

13. The acceleration sensor of claim 12, wherein said rods consist of a metallized plastic material.

14. The acceleration sensor of claim 9, wherein said rods have a thickness of only a few $\mu$m and a length equal to 200 to 1000 times their thickness.

15. The acceleration sensor of claim 7, wherein said rods are tongue-shaped, said rods being arranged in a position perpendicular to a direction of said acceleration to be measured, said rods having different thicknesses.

16. The acceleration sensor of claim 7, wherein said rods are designed as two-way-contacts with their first electric contact elements resting upon a first set of second electric contact elements when said rods are undeflected while resting individually upon a second set of electric contact elements respectively when said rods are individually deflected, said two-way-contacts being connected in series in their undeflected position, and being connected in parallel in their deflected position.

17. The acceleration sensor of claim 7, wherein said free ends of said rods project freely in an undeflected position, without making any contact, while under the effect of an acceleration they move in diametrically opposite directions towards sets of second contact elements arranged on both sides of said rods, respectively.

18. The acceleration sensor of claim 7, having an evaluation unit, said evaluation unit comprising a bit-pattern memory and a digital comparator, connected to said bit-pattern memory and to said second electric contact elements, respectively.

19. The acceleration sensor of claim 18, wherein said evaluation unit comprises a recoder.

20. The acceleration sensor of claim 7, wherein said rods, said base member and said wall are made by a lithographic-galvanotechnical imaging process (LIGA).

21. The acceleration sensor of claim 7, wherein said rods, said base member and said wall are made by a silicon etching technology.

* * * * *